US006726095B2

(12) United States Patent
Tamura

(10) Patent No.: US 6,726,095 B2
(45) Date of Patent: Apr. 27, 2004

(54) MEDIUM PROCESSING APPARATUS AND BILL PROCESSING APPARATUS

(75) Inventor: Eiji Tamura, Kyoto (JP)

(73) Assignee: Omron Corporation, Kyoto (JP)

( * ) Notice: Subject to any disclaimer, the term of this patent is extended or adjusted under 35 U.S.C. 154(b) by 9 days.

(21) Appl. No.: 09/843,707

(22) Filed: Apr. 30, 2001

(65) Prior Publication Data

US 2002/0020737 A1 Feb. 21, 2002

(30) Foreign Application Priority Data

May 2, 2000 (JP) .................................... P. 2000-133251

(51) Int. Cl.7 ................................................ G06F 17/60
(52) U.S. Cl. ........................................................ 235/379
(58) Field of Search ................................. 235/379, 484

(56) References Cited

U.S. PATENT DOCUMENTS 5,021,639 A * 6/1991 Hara et al. .................. 235/379
5,547,062 A * 8/1996 Mays et al. ................. 194/206
6,015,147 A * 1/2000 Kimura et al. .............. 271/163
6,164,642 A * 12/2000 Onipchenko et al. ....... 271/240
6,170,822 B1 * 1/2001 Kato et al. .................. 271/298

FOREIGN PATENT DOCUMENTS

KR 1989-0001801 5/1989
KR 2000-0006506 1/2000

* cited by examiner

*Primary Examiner*—Mark Tremblay
(74) *Attorney, Agent, or Firm*—Dickstein Shapiro Morin & Oshinsky LLP

(57) ABSTRACT

The sort result of sorting into the denominations of bills fitted to storage and the denominations of bills not fitted to storage for each of cartridges 11$a$ to 11$d$ placed in a main unit of an apparatus are displayed on a display section 4. When the denomination of bills to be stored for each of the cartridges 11$a$ to 11$d$ is entered in an input section 3, a control section 2 sets the denomination of bills to be stored for each of the cartridges based on the entry. Thus, the denomination of bills to be stored for each of the cartridges 11$a$ to 11$d$ can be set by the easy operation of entering the denomination of bills to be stored for each of the cartridges 11$a$ to 11$d$ in the input section 3.

15 Claims, 7 Drawing Sheets

FIG.7A

GUIDE ATTACHMENT POSITION INFORMATION

| | ATTACHMENT POSITIONS |
|---|---|
| CARTRIDGE 11a | D |
| CARTRIDGE 11b | C |
| CARTRIDGE 11c | B |
| CARTRIDGE 11d | B |

FIG.7B

GUIDE-TO-GUIDE SIZE INFORMATION

| | GUIDE-TO-GUIDE DISTANCE(mm) |
|---|---|
| ATTACHMENT POSITION A | 180 |
| ATTACHMENT POSITION B | 170 |
| ATTACHMENT POSITION C | 160 |
| ATTACHMENT POSITION D | 150 |

SELECT DENOMINATION FOR EACH CARTRIDGE.
THE PROPER DENOMINATION TO EACH CARTRIDGE IS INDICATED BY ○.
THE DENOMINATION NOT INDICATED BY ○ CAN NOT BE SELECTED.

| | $1000 | $500 | $100 | $50 |
|---|---|---|---|---|
| CARTRIDGE 11a | — | — | ○ | ○ |
| CARTRIDGE 11b | — | ○ | ○ | — |
| CARTRIDGE 11c | ○ | ○ | — | — |
| CARTRIDGE 11d | ○ | ○ | — | — |

MEDIUM PROCESSING APPARATUS AND BILL PROCESSING APPARATUS

BACKGROUND OF THE INVENTION

1. Field of the Invention

This invention relates to a medium processing apparatus for sorting and storing, by type, media entered into a main unit of an apparatus, and a bill processing apparatus incorporating the medium processing apparatus.

2. Description of the Related Art

Hitherto, a bill processing apparatus, which checks a plurality of bills entered in a main unit of an apparatus through an input slot for type (denomination) of each bill and stores the bills in a cartridge placed in the main unit of the apparatus, has been available. An example of such a bill processing apparatus is an automatic telling machine (ATM), an exchange machine, etc., used in financial institutions such as banks.

By the way, the bill processing apparatus in the related art comprises one cartridge placed in the main unit of the apparatus, wherein entered bills are stored in the cartridge regardless of their denomination. Therefore, bills of different denomination are mixed in the cartridge. Sorting bills taken out from the cartridge by denomination must be performed and this sort work takes time and labor; this is a problem.

What is needed is an apparatus wherein bills entered in a main unit of the apparatus, namely paid-in bills, can be used as bills to be paid out. This would allow storing as little cash as possible in the main unit of the apparatus for the reason of crime prevention.

Then, as an apparatus for solving the problem, an apparatus comprising a plurality of cartridges in a main unit for sorting and storing entered bills by denomination is proposed. The apparatus has the advantage that the main unit of the apparatus can be miniaturized by using the cartridges storing the bills to be paid out without providing a new cartridge for storing entered bills for each denomination.

However, bill processing apparatuses in the related art have a configuration wherein setting of the denomination of bills stored in each cartridge cannot easily be changed. Thus, when the operating environment of the main unit of the apparatus changes, for example when the type of bill to be handled changes, changing the denomination of bills stored in each cartridge takes time and labor; this is a problem.

To use paid-in bills also as bills to be paid out, unless the bills in the cartridge are neatly stacked on each other, carries with it a high probability of the occurrence of a jam when bills are paid out from the cartridge, and the reliability of the main unit of apparatus is degraded. Therefore, each cartridge must be formed to the size matching the denomination of bills stored in the cartridge. Thus, when the denomination of bills stored in the cartridge is changed, the cartridge must also be replaced with a cartridge of the size matching the new denomination. Changing the denomination of bills stored in the cartridge is very cumbersome, and the costs incurred from the changing (purchase cost of the new cartridge, etc.,) are high; this is a problem. Particularly, oversea bills such as dollar bills vary largely in size between denominations as compared with yen bills circulated in Japan.

SUMMARY OF THE INVENTION

It is therefore an object of the invention to provide a medium processing apparatus wherein the type of media to be stored in each of the cartridges placed in a main unit of an apparatus can be changed easily, and a bill processing apparatus incorporates the medium processing apparatus.

It is another object of the invention to provide a medium processing apparatus wherein costs of changing the type of media to be stored in each of the cartridges placed in a main unit of the apparatus are reduced, and a bill processing apparatus incorporates the medium processing apparatus.

To solve the problems, the medium processing apparatus of the invention comprises:

(1) A plurality of cartridges for storing media;

a storage section for storing size determination information to determine the size of the medium fitted for storage in each of the cartridges and medium size information indicating the size of the medium for each type of medium;

an output section for outputting the sort result of sorting into a medium type fitted for storage and a medium type not fitted for storage, using the size determination information and the medium size information for each of the cartridges;

an input section for entering the type of medium to be stored for each of the cartridges; and a control section for setting the type of medium to be stored for each of the cartridges based on the entry in the input section.

In this configuration, the output section outputs the sort result of sorting into a medium type fitted for storage and a medium type not fitted for storage for each of the cartridges placed in the main unit of the apparatus. When the type of media to be stored for each of the cartridges is entered in the input section, the control section sets the type of media to be stored for each of the cartridges based on the entry.

Therefore, the type of media to be stored for each of the cartridges is simply entered in the input section, whereby the type of media to be stored in each of the cartridges can be set and can also be changed easily.

Since the sort result of sorting entered media into a medium type fitted for storage and a medium type not fitted for storage for each of the cartridges, the output can be used to easily select the media type fitted for storage for each of the cartridges.

(2) The output section has a display section for displaying the sort result.

In this configuration, the sort result is displayed on the output section.

(3) The input section has a touch panel placed on a display screen of the display section.

In this configuration, the type of media to be stored in each of the cartridges can be entered on the tough panel placed on the display screen of the display section, which displays the sort result. Therefore, the type of media to be stored in each of the cartridges can be entered while viewing the screen displaying the sort result.

(4) When a medium type not fitted for storage for any of the cartridges is entered in the input section, the control section functions to invalidate the entry.

In this configuration, when the entered medium type is not fitted to storage for any of the cartridges, the entry is invalidated. Thus, the medium type not fitted to storage for each of the cartridges is not set as a medium to be stored in a corresponding cartridge.

(5) The cartridge comprises guides, for regulating the storage area of media, such that the guides can be moved whenever necessary, and the size determination information contains information indicating the positions of the guides in the cartridge.

In this configuration, if the positions of the guides placed in the cartridge are changed, the storage area for the media is changed, and thus the type of media fitted to storage in the cartridge can be changed. Therefore, unlike the apparatuses in the related art, the type of media fitted to storage can be changed simply by changing the positions of the guides without replacing the cartridge itself. Thus, a new cartridge need not be purchased and the cost required for the change over work is reduced.

(6) The input section has a function of entering the information indicating the positions of the guides.

In this configuration, the positions of the guides in each of the cartridges are entered from the input section as part of the size determination information.

(7) The medium processing apparatus further comprises a guide position detection section for detecting the positions of the guides.

In this configuration, the guide position detection section detects the positions of the guides of each of the cartridges. As such, the labor of entering the positions of the guides in each of the cartridges, as a part of the size determination information, can be saved, and occurrences of entry mistakes can be prevented.

BRIEF DESCRIPTION OF THE DRAWINGS

FIGS. 7A and 7B are drawings to show guide attachment position information and guide-to-guide size information;

DETAILED DESCRIPTION OF A PREFERRED EMBODIMENT

Figure 1:
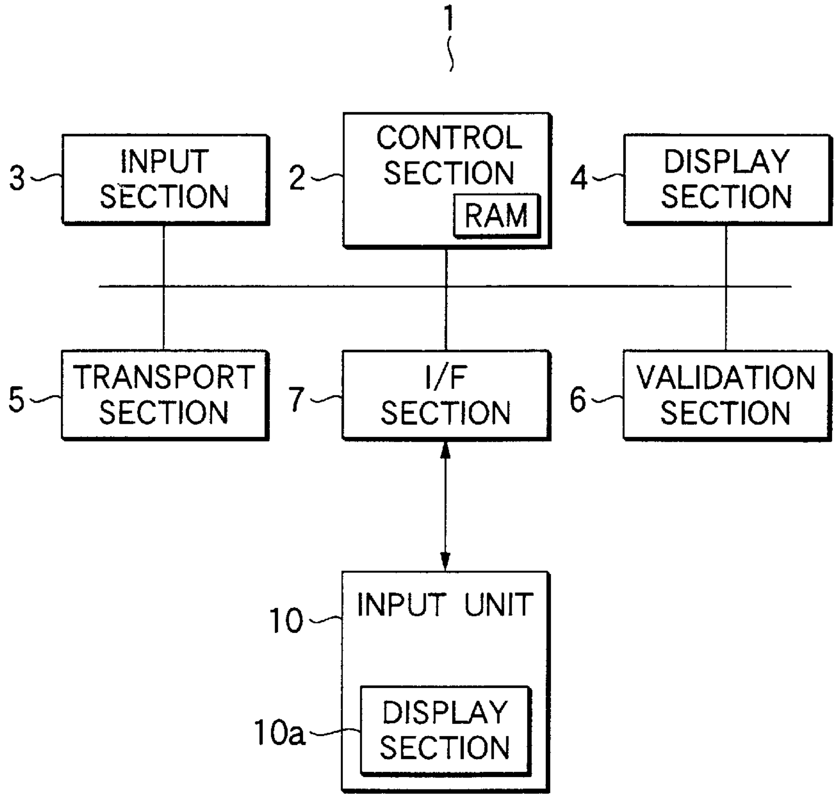
FIG. 1 is a block diagram to show the configuration of a bill processing apparatus of an embodiment of the invention.

FIG. 1 is a block diagram to show the configuration of a bill processing apparatus of an embodiment of the invention. The bill processing apparatus 1 of the invention comprises a control section 2, an input section 3, a display section 4, a transport section 5, a validation section 6, and an interface section 7 (I/F section 7). The control section 2 controls the operation of a main unit. The input section 3 performs input operations. The display section 4 displays the operation state of the main unit and the like. The transport section 5 transports bills entered in the main unit. The validation section 6 checks a bill entered in the main unit for its type (denomination). An external machine is connected to the interface section 7. The input section 3 has a touch panel placed on a display screen of the display section 4 to enable the user to enter a command, etc., in the main unit of the apparatus on the display screen of the display section 4. The validation section 6 detects the size, etc., of each bill entered in the main unit of the apparatus and checks the bill for its type (denomination). An input unit 10 having a display section 10*a* can be connected to the I/F section 7, and the operator (user) can also enter a command, etc., in the main unit of the apparatus from the input 10.

Figure 2:
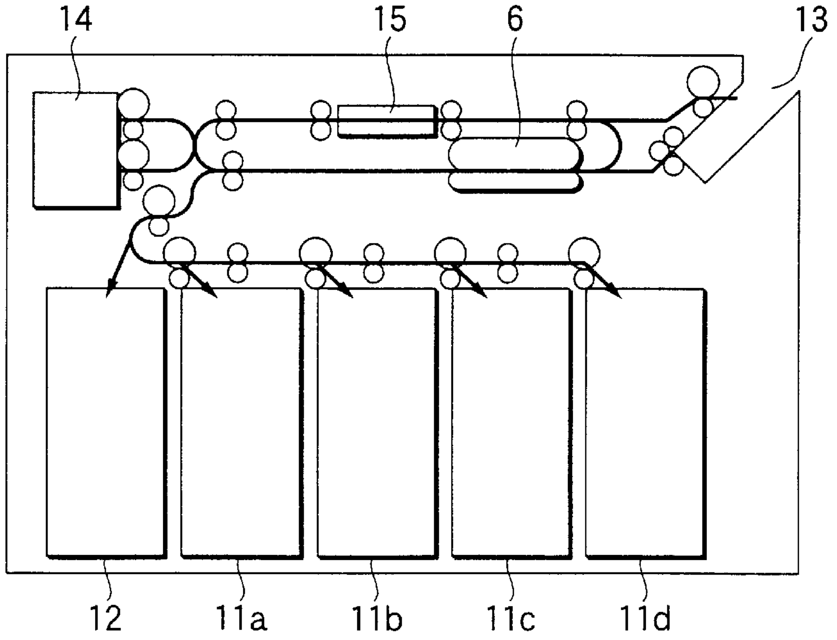
FIG. 2 is a schematic drawing to show configuration of a mechanical section of the bill processing apparatus of an embodiment of the invention.

FIG. 2 is a schematic drawing to show an arrangement of a mechanical section of the bill processing apparatus. The bill processing apparatus 1 of the embodiment comprises five cartridges 11 (11*a*, 11*b*, 11*c* and 11*d*) and 12. In the figure, the right four cartridges 11 (11*a* to 11*d*) are the same except that the attachment positions of guides 21 (described later) are adjusted separately. An entered bill whose denomination cannot be identified when it is stored is stored in the cartridge 12.

Figure 3A:
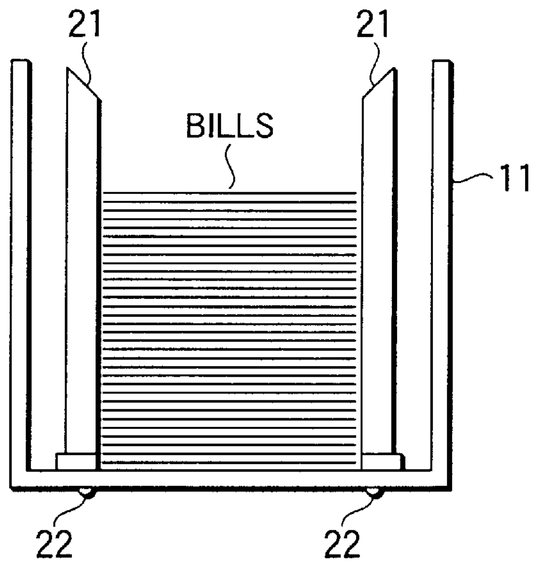
FIGS. 3A and 3B are drawings to show the configuration of a cartridge for the bill processing apparatus of an embodiment of the invention.
Figure 3B:
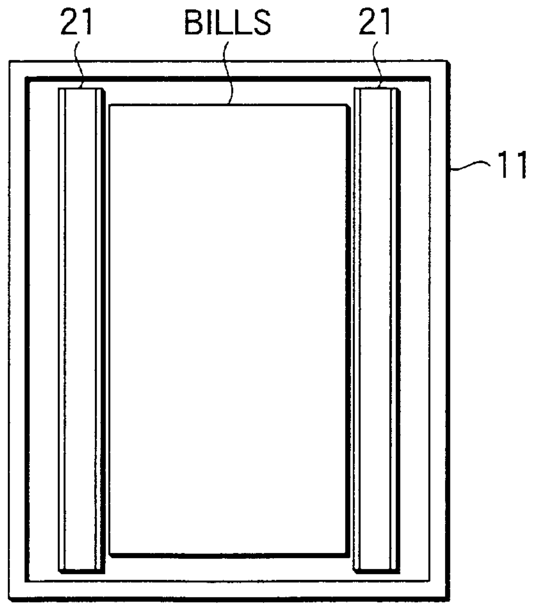
Figure 4A:
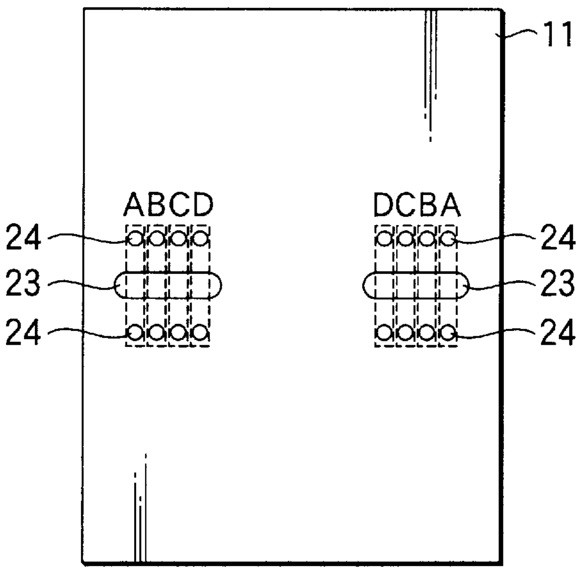
FIGS. 4A and 4B are drawings to show the configuration of the cartridge for the bill processing apparatus of an embodiment of the invention.
Figure 4B:
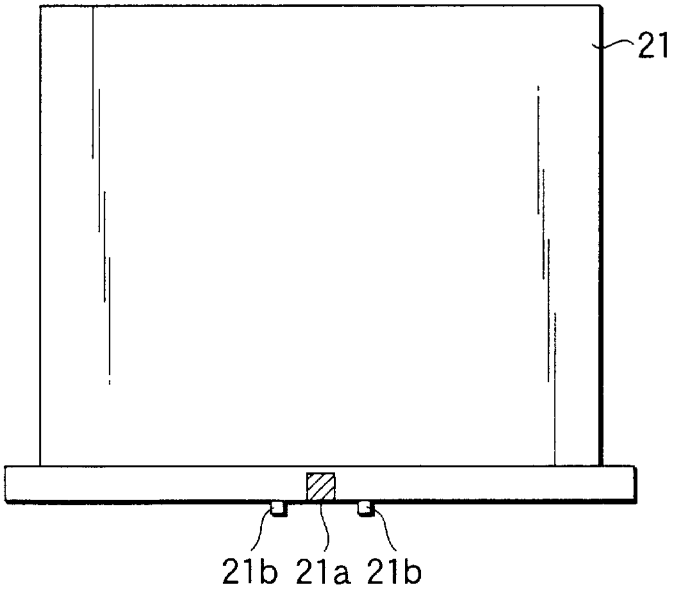

The cartridge 11 will now be discussed. FIG. 3A is a front sectional view of the cartridge 11 and FIG. 3B is a top view of the cartridge 11. The cartridge 11 is a box-like case opened on the top and stores bills between the guides 21 placed on both sides inside of the case. Each guide 21 is fixed by a screw 22 at the bottom of the cartridge 11. Openings 23 are shaped like long slots, each for allowing the screw 22 for fixing the guide 21 to pass through, and are formed on both sides of the bottom of the cartridge 11, as shown in FIG. 4A. A plurality of pairs of positioning openings 24 for determining the attachment position of the guide 21 (in the figure, four pairs of A, B, C, and D) are made above and below each opening 23. The guide 21 has a screwing tap 21*a* and a pair of projections 21*b* fitted into the positioning openings 24 on the bottom (see FIG. 4B).

As seen from the description given above, the guide 21 can be attached to any position of A, B, C or D shown in FIG. 4A and the attachment position can also be changed easily. If the attachment position is changed, the distance between the guides 21 changes. Bills are stored between the guides 21 placed in the cartridge 11 and thus the size of each bill fitted to storage in the cartridge 11, namely the denomination of each bill fitted to storage in the cartridge 11, is determined by the attachment positions of the guides 21. In the figure, when the attachment positions of the guides 21 are A, the size of each bill fitted to storage is the largest (the width between the guides 21 is the maximum); when the attachment positions are D, the size of each bill fitted to storage is the smallest (the width between the guides 21 is the minimum).

Referring again to FIG. 2, a transport passage for transporting bills entered into an input slot 13 is formed and a validation section 6 for determining the denomination of each bill transported on the transport passage is placed above the cartridges 11 and 12. The transport passage is formed with branch paths for introducing bills into a temporary hold section 14 and a returned bill hold section 15. The temporary hold section 14 temporarily holds each bill whose denomination is determined at the time of the paying-in operation. The returned bill hold section 15 temporarily holds each bill whose denomination cannot be determined at the time of the paying-in operation. Further, the transport passage is formed with branch paths for introducing bills into the cartridges 11 and 12 at the time of the storage operation.

The paying-in operation and the storage operation are an operation sequence; the paying-in operation of bills entered into the input slot is executed first, and then the storage operation is executed. The paying-in operation and the storage operation will be discussed later in detail.

Further, the bill processing apparatus 1 of the embodiment stores bill denomination information, setting the denomination of bills stored for each of the cartridges 11 (11*a*, 11*b*, 11*c*, and 11*d*). For example, the correspondences among the denominations of bills to be stored and the cartridges can be set as follows: Cartridge 11*a*—1000-dollar bills, cartridge 11*b*—500-dollar bills, cartridge 11*c*—100-dollar bills, and cartridge 11*d*—50-dollar bills. The stored bill denomination information is stored in a RAM (FIG. 1) provided in the control section 2.

Figure 5:
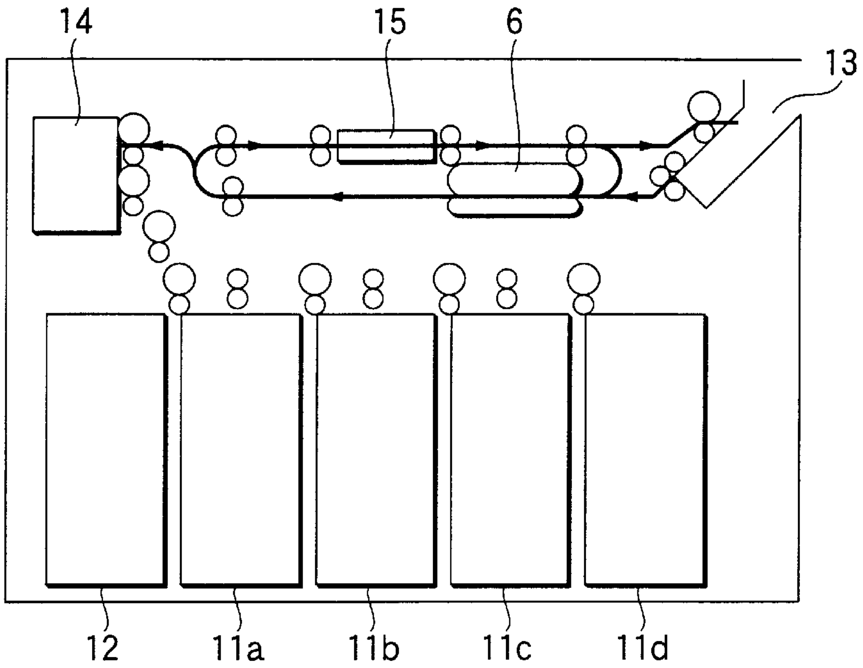
FIG. 5 is a drawing to show the paying-in operation in the bill processing apparatus of an embodiment of the invention.
Figure 6:
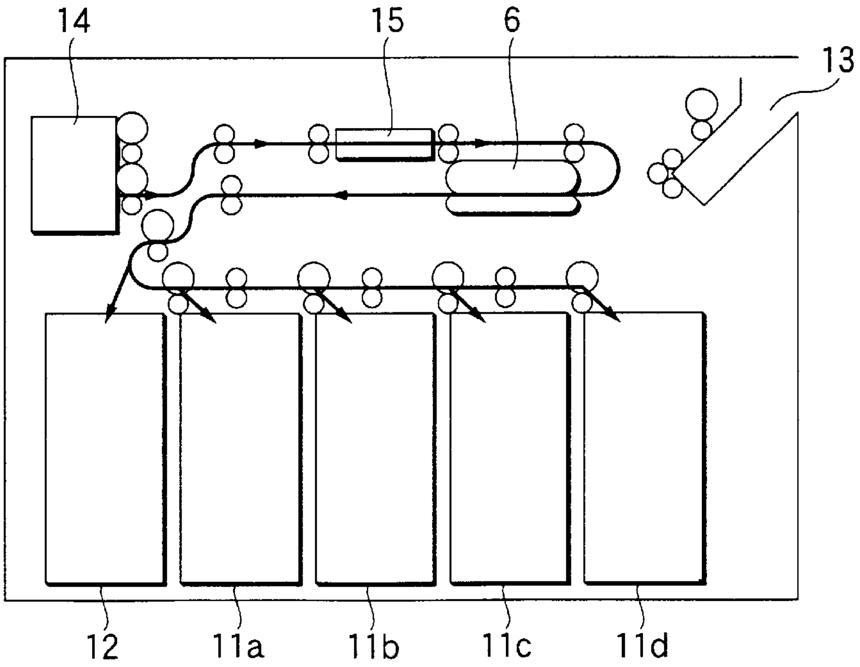
FIG. 6 is a drawing to show the storage operation in the bill processing apparatus of an embodiment of the invention.

Next, the paying-in operation and the storage operation of the bill processing apparatus 1 of the embodiment will be discussed. FIG. 5 is a drawing to show the bill transport passage in the paying-in operation and FIG. 6 is a drawing to show the bill transport passage in the storage operation. FIG. 5 does not show the transport passage not used at the time of the paying-in operation. FIG. 6 does not show the transport passage not used at the time of the storage operation.

The bill processing apparatus 1 transports the bills entered into the input slot 13 to the validation section 6 one by one. The validation section 6 detects the size, etc., of each bill and determines the denomination of the bill. The bill processing apparatus 1 switches the bill transport passage depending on whether or not the denomination can be determined in the validation section 6 for storing the bill, whose denomination is determined, in the temporary hold section 14, and storing the bill whose denomination cannot be determined in the returned bill hold section 15

After the bill processing apparatus 1 stores all bills entered into the input slot 13 in the temporary hold section 14 or the returned bill hold section 15, it transports the bills stored in the returned bill hold section 15 to the input slot 13, thereby returning the bills whose denomination cannot be determined to the person entering the bill (the user of the apparatus). When the denominations of all bills entered into the input slot 13 can be determined, no bills are stored in the returned bill hold section 15 and no bills are returned to the user.

The paying-in operation is now complete. After this, a transaction is conducted based on the total amount of the bills stored in the temporary hold section 14. For example, paying-in processing, exchange processing, etc., is performed as the transaction. Since the bills stored in the temporary hold section 14 are bills whose denomination is determined, the total amount of the bills stored in the temporary hold section 14, namely, the bills entered into the main unit of the apparatus (except returned bills) is calculated and the transaction can be conducted based on the total amount.

Upon completion of the transaction, the bill processing apparatus 1 starts the storage operation of storing the bills held in the temporary hold section 14 in the cartridges 11, 12. The storage operation will be discussed with reference to FIG. 6. In the storage operation, the bills held in the temporary hold section 14 are paid out one by one, and again transported to the validation section 6 for determining the denominations of the bills. At this time, the bill processing apparatus 1 switches the bill transport passage for storing each bill, whose denomination cannot be determined in the validation section 6, in the cartridge 12, and storing each bill whose denomination is determined in the corresponding one of the cartridges 11 (11*a* to 11*d*) in response to the determined denomination. The denomination of bills to be stored is set for each cartridge 11 as described above. For example, if the correspondences thereamong are set as cartridge 11*a*—1000-dollar bills, cartridge 11*b*—500-dollar bills, cartridge 11*c*—100-dollar bills, and cartridge 11*d*—50-dollar bills, the bill determined to be a 1000-dollar bill in the validation section 6 is stored in the cartridge 11*a*. When all bills held in the temporary hold section 14 are stored in the corresponding cartridges 11, 12, the storage operation is complete.

The bill processing apparatus 1 of the embodiment thus sorts and stores the bills entered into the input slot 13 in the cartridges 11 (11*a* to 11*d*) by denomination. Therefore, the official in charge of the apparatus need not carry out the sort of work requiring the bills to be taken out from the cartridges 11 (11*a* to 11*d*). The bill whose denomination cannot be determined in the validation section 6 is stored in the cartridge 12 as described above.

Next, the process of setting the denominations of bills stored in the cartridges 11 (11*a* to 11*d*) will be discussed. The bill processing apparatus 1 of the embodiment stores guide attachment position information indicating the attachment positions of the guides 21 for each of the cartridges 11*a* to 11*d* (see FIG. 7A) and also stores guide-to-guide size information indicating the distance between the guides 21 corresponding to the attachment positions of the guides 21 (see FIG. 7B) in the RAM provided in the control section 2. The guide attachment position information and the guide-to-guide size information correspond to size determination information mentioned above.

When the official in charge of the apparatus changes the attachment positions of the guides 21 of any cartridge 11 (11*a* to 11*d*), he or she also changes the guide attachment position information stored in the main unit of the apparatus. The official in charge can change the guide attachment position information by performing an entry operation in the input section 3. The official in charge changes the attachment positions of the guides 21 for any of the cartridges 11*a* to 11*d* normally when he or she changes the denomination of the bills to be stored in the corresponding cartridge 11.

When the official in charge of the apparatus changes the attachment positions of the guides 21 of any cartridge 11 (11*a* to 11*d*), he or she performs an entry operation for changing the guide attachment position information for the cartridge 11 (11*a* to 11*d*), for which the attachment positions of the guides 21 are changed. Specifically, in the input section 3, the official in charge enters newly setup attachment positions of the guides 21 (A, B, C or D) for the cartridge 11 (11*a* to 11*d*) for which the attachment positions of the guides 21 are changed. The bill processing apparatus 1 changes the guide attachment position information based on the entry in the input section 3.

Figure 8:
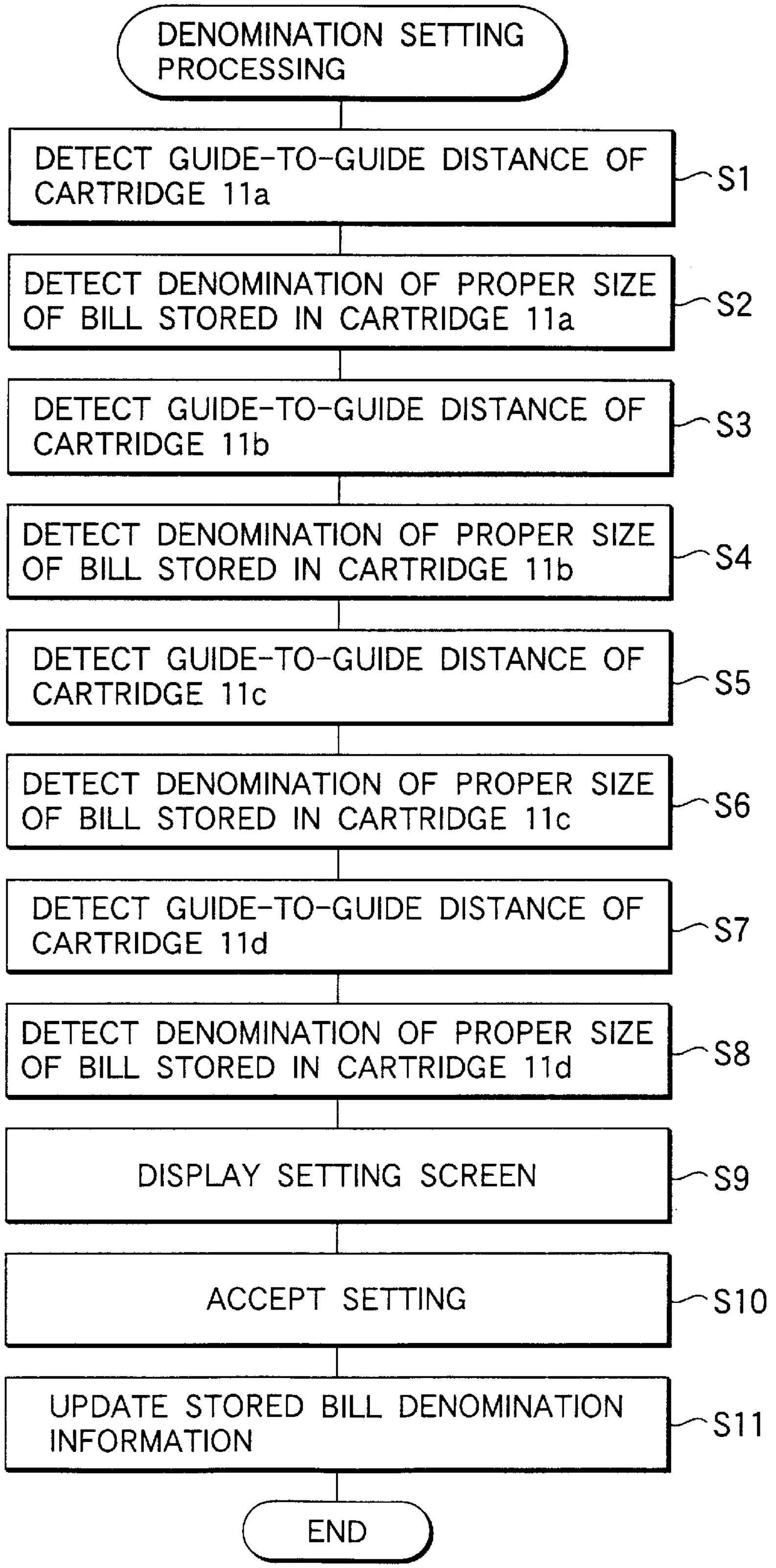
FIG. 8 is a flowchart to show denomination setting processing in the bill processing apparatus of an embodiment of the invention.

When the bill processing apparatus 1 changes the guide attachment position information, it executes denomination setting processing of setting the denomination of bills stored in each of the cartridges 11*a* to 11*d*. FIG. 8 is a flowchart to show the denomination setting processing. The bill processing apparatus 1 detects the guide-to-guide distance for each of the cartridges 11*a* to 11*d*, and detects the denomination of bills fitted to storage using the detected guide-to-guide distance as denomination detection processing (s1 to s8). The detection of the guide-to-guide distance at s1, s3, s5, and s7 is a process of reading the attachment positions of the guides 21 from the guide attachment position information shown in FIG. 7A, and further reading the guide-to-guide distance from the guide-to-guide size information shown in FIG. 7B based on the read attachment positions of the guides 21. The denomination detection processing at s2, s4, s6, and s8 is extracting the denomination of a bill having width Y in the range:

$$(X-20)\text{mm}<Y<(X-2)\text{mm}$$

relative to guide-to-guide distance X as the denomination of the bill fitted to storage.

The bill size for each denomination is stored in the main unit of the apparatus as bill size information (not shown). The bill size information is information originally stored to determine the denomination of each bill in the validation section 6, and the bill processing apparatus 1 uses the bill size information to detect the denomination of bills fitted to storage in each cartridge 11.

For the denomination of a bill having the width Y greater than the guide-to-guide distance X, the bill cannot be stored in the cartridge 11 and thus the denomination is not fitted to storage therein. For the denomination of a bill having the width Y extremely smaller than the guide-to-guide distance X (in this case, 20 mm or less), the bill can be stored in the cartridge 11, but is not stored in a neat stack. Thus, the official in charge must align the bills taken from the cartridge 11; this work takes time and labor. If the bills are not stored in a neat stack in the cartridge 11, the jam occurrence probability at the time of paying-out becomes high and thus the bills cannot be used as bills to be paid out. From these reasons, in the embodiment of the invention, the denomination of a bill having the width Y extremely smaller than the guide-to-guide distance X (in this case, 20 mm or less) is a denomination not fitted to storage.

Figures 9, 10:
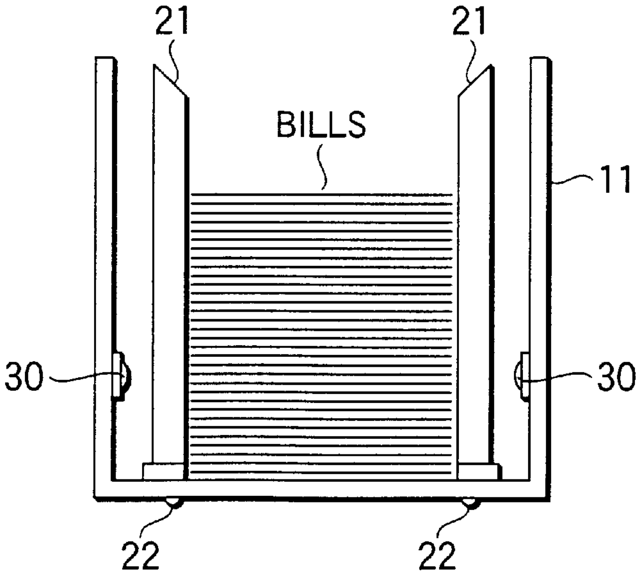
FIG. 9 is a drawing to show an example of a setting screen on a display section in the bill processing apparatus of an embodiment of the invention.
FIG. 10 is a drawing to show the configuration of a cartridge for a bill processing apparatus according to another embodiment of the invention.

When the bill processing apparatus 1 detects the denomination of bills fitted to storage for each of the cartridges 11*a* to 11*d*, it displays a setting screen on the display section 4 prompting a user to accept the setting of the denomination of bills stored in each of the cartridges 11*a* to 11*d* (s9). FIG. 9 shows the setting screen displayed on the display section 4 at s9. The denominations of bills fitted to storage for each of the cartridges 11*a* to 11*d* are displayed on the setting screen. The figure indicates that the denominations of bills fitted to storage in the cartridge 11*a* are 50-dollar and 100-dollar denominations, that the denominations of bills fitted to storage in the cartridge 11*b* are 100-dollar and 500-dollar denominations, and that the denominations of bills fitted to storage in the cartridges 11*c* and 11*d* are 500-dollar and 1000-dollar denominations.

A touch panel is provided on the display screen of the display section 4 for the official in charge to set and enter the denomination of bills stored for each of the cartridges 11*a* to 11*d* on the screen shown in FIG. 9. For example, to set the denomination of bills stored in the cartridge 11*a* to the 50-dollar denomination, the official in charge presses on the display screen the top of the part indicating whether or not the 50-dollar denomination is fitted to storage in the cartridge 11*a*. Accordingly the denomination of bills stored in the cartridge 11*a* can be set to the 50-dollar denomination.

When the denomination of bills not fitted to storage is entered as the denomination of bills stored in the cartridge 11, specifically when the official in charge presses a part where is not displayed on the display screen of the display section 4, the bill processing apparatus 1 invalidates the entry. Thus the denomination of bills not fitted to storage in each of the cartridges 11*a* to 11*d* is not set.

When the bill processing apparatus 1 accepts entry setting the denomination of bills stored in each of the cartridges 11*a* to 11*d*, it updates stored bill denomination information based on the setting entry and terminates the processing (s10 and s11).

The bill processing apparatus 1 of the embodiment thus enables the official in charge to easily change the denomination of bills stored for each of the cartridges 11*a* to 11*d*. Therefore, work required for changing the denomination of bills stored for each cartridge 11, with change in the operating environment of the main unit of apparatus or the like, can be saved. The size of a bill fitted to storage in each of the cartridges 11*a* to 11*d* can be changed simply by changing the attachment positions of the guides 21 to the corresponding one of the cartridge 11*a* to 11*d*, so that a new cartridge need not be purchased for the change. Moreover, each of the cartridges 11*a* to 11*d* is adjusted to the size matching the size of a bill to be stored by changing the attachment positions of the guides 21, and thus the bills are stored in a neat stack in each of the cartridges 11*a* to 11*d*. Therefore, if the bills are used as bills to be paid out, probability of a jam occurring when the bills are paid out from the cartridge 11*a* to 11*d* can be sufficiently reduced. Also the problem of degraded reliability of the main unit of the apparatus does not occur.

In the description of the embodiment, the case where the denomination of bills stored in each of the cartridges 11*a* to 11*d* is set on the touch panel (input section 3) provided on the display section 4 is described only as an example; the denomination can also be set, for example, on the input unit 10 which is connected to the I/F section 7.

In the description of the embodiment, the process by which denomination of bills stored in the cartridge (11*a* to 11*d*) is changed is described only as an example; for example, the apparatus used so far for handling dollar bills can be changed to a processing apparatus for any other currency, such as yen bills. In this case, the processing program for checking bills needs to be changed so that the validation section 6 can check new currency (bills).

Therefore, the apparatus can accommodate the currency of any desired country simply by changing the processing program for checking bills in the validation section 6, without changing the configuration of the main unit of apparatus. As such, an advantage of decreasing costs for the main unit of the apparatus can also be provided.

In the embodiment, the official in charge enters the attachment positions of the guides 21 for each of the cartridges 11*a* to 11*d*. Alternatively, reflection-type photosensors 30 may be provided, for example, as shown in FIG. 10, so that the attachment positions of the guides 21 can be detected automatically. In doing so, the entry operation involved in changing the guide attachment position information when the attachment positions of the guides 21 are changed becomes unnecessary, and mistakes in the entry operation can also be prevented.

The attachment positions of the guides 21 in the cartridge 11 may also be adjusted with a motor. In doing so, work of removing the screws 22, etc., becomes unnecessary for changing the attachment positions of the guides 21 in the cartridge 11. This type of work can thus be conducted more easily.

Further, the bill processing apparatus of the embodiment can be applied not only to an automatic telling machine, an exchange machine, etc., used in banks, etc., but also to any other type of bill processing apparatus. The medium processing apparatus according to the invention can also be applied to an apparatus for processing media other than bills.

As described above, according to the invention, the type of media to be stored in each of the cartridges is simply entered in the input section, whereby the type of media to be stored in each of the cartridges can be set. Thus, work can be reduced when the type of media to be stored for each of the cartridges is changed with change in the operating environment of the main unit of the apparatus, etc.

The size of a medium fitted to storage can be changed simply by changing the attachment positions of the guides in the cartridge, so that a new cartridge need not be purchased with the change, and thus the cost required for the change can also be reduced.

What is claimed is:

1. A medium processing apparatus comprising:

a plurality of cartridges for storing media;

a storage section for storing size determination information to determine size of a medium fit for storage in each of said plurality of cartridges, and medium size information indicating the size of each type of medium;

an output section for outputting a sort result of sorting media into a medium type fit for storage and a medium type not fit for storage in each of said plurality of cartridges, said sorting accomplished using the size determination information and the medium size information;

an input section for entering the type of medium to be stored in said plurality of cartridges; and a control section for setting the type of medium to be stored for each of said plurality of cartridges based on the entry in said input section.

2. The medium processing apparatus of 1, wherein said output section has a display section for displaying the sort result.

3. The medium processing apparatus of claim 2, wherein said input section is a touch panel placed on a display screen of the display section.

4. The medium processing apparatus of claim 1, wherein when a medium type not fit for storage in any of said plurality of cartridges is entered in said input section, said control section functions to invalidate the entry.

5. The medium processing apparatus of claim 1, wherein each of said plurality of cartridges comprises movable guides for regulating a storage area of media, wherein the size determination information contains information indicating positions of the guides in each of said plurality of cartridges.

6. The medium processing apparatus of claim 5, wherein said input section functions to enter information indicating the positions of the guides.

7. The medium processing apparatus of claim 5, further comprising a guide position detection section for detecting the positions of the guides.

8. The medium processing apparatus of claim 7, wherein said position is detected by photosensors.

9. The medium processing apparatus of claim 5, further comprising:

a determination section for determining, as the medium type fit for storage, medium which satisfies the following equation:

$$(X-20)\text{mm}<Y<(X-2)\text{mm}$$

wherein Y is width of the medium; and X is distance between the guides of the cartridge.

10. The medium processing apparatus of claim 5, wherein said cartridges have a plurality of pairs of positioning openings for determining an attachment position of the guides, and said guides have a plurality of pairs of projections fitted into the positioning openings.

11. The medium processing apparatus of claim 5, wherein movement of said movable guides is controlled by a motor.

12. A bill processing apparatus comprising:

a plurality of cartridges for storing bills;

a storage section for storing size determination information to determine size of a bill fit for storage in each of said plurality of cartridges, and bill size information indicating size of each type of bill;

an output section for outputting a sort result of sorting bills into a bill type fit for storage and a bill type not fit for storage in each of said plurality of cartridges, said sorting accomplished using the size determination information and the bill size information;

an input section for entering the type of bill to be stored in said plurality of cartridges; and a control section for setting the type of bill to be stored in each of said plurality of cartridges based on the entry in said input section.

13. The apparatus of claim 12, wherein each of said plurality of cartridges comprises movable guides for regulating a storage area of media, wherein the size determination information contains information indicating positions of the guides in each of said plurality of cartridges.

14. The apparatus of claim 13, wherein movement of said movable guides is controlled by a motor.

15. The medium processing apparatus of claim 13, wherein position of said movable guides is detected by photosensors.

* * * * *